May 3, 1927.
R. GOUIRAND ET AL
1,627,172
CLAMP
Filed March 6, 1925
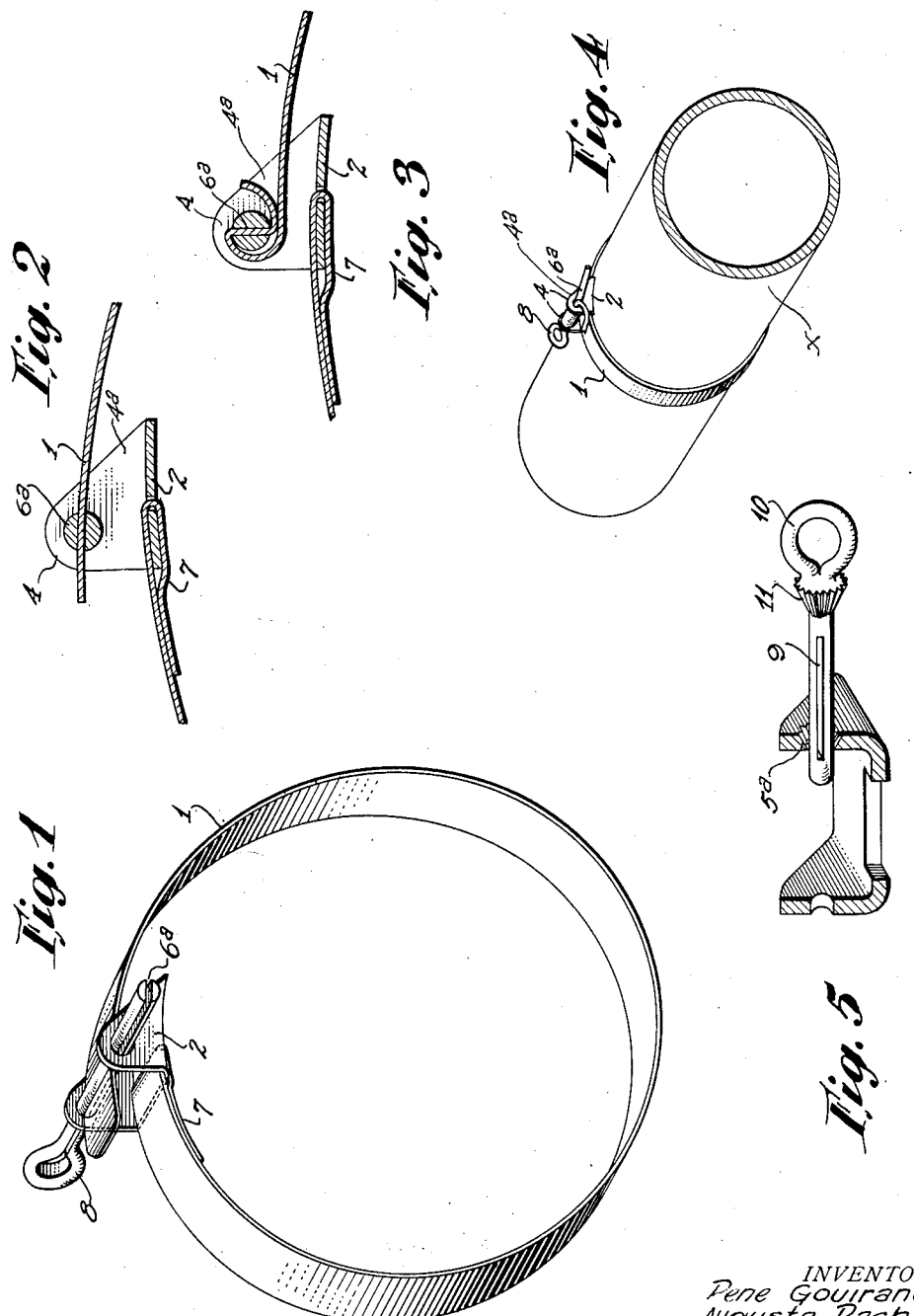

Patented May 3, 1927.

1,627,172

UNITED STATES PATENT OFFICE.

RENÉ GOUIRAND AND AUGUSTE PACHE, OF NEW YORK, N. Y.; JULIA PACHE ADMINISTRATRIX OF SAID AUGUSTE PACHE, DECEASED.

CLAMP.

Application filed March 6, 1925. Serial No. 13,494.

This invention is a clamp adapted for many varied uses and is particularly directed to that type of construction wherein the clamping is accomplished by placing a flexible band under tension.

The object of the invention is to provide a clamp of simple and economical construction and one wherein the tensioning of the band is accomplished through the wrapping of the band about a manually rotatable pin which may be thereafter manipulated to lock the band against inadvertent release.

In its preferred practical form, the invention embodies a yoke to which one end of the band is fixed and which yoke is provided with bearings to rotatably lock the locking pin. A conventional cotter pin is employed in the preferred form of the invention and after the free end of the band is passed through the slit of said pin, the pin may be rotated to wind the band upon the pin and draw the body of the band about the object to be clamped. After the desired tension has been applied to the band, retrograde rotation of the pin may be accomplished by bending the cotter pin in the usual manner of bending such a pin to preclude its withdrawal. The advantages of the construction are the extreme simplicity, economy of manufacture and efficiency in operation.

In another practical form of the invention, the locking pin may be provided with a serrated surface which, after the band is properly tensioned, may be moved into cooperation with the correspondingly shaped surface formed on the yoke, so that the pin may be locked against inadvertent release without necessitating the bending of the pin.

Features of the invention, other than those specified, will be apparent from the hereinafter detailed description and claim, when read in conjunction with the accompanying drawings.

The accompanying drawings illustrate different practical embodiments of the invention, but the constructions therein shown are to be understood as illustrative, only, and not as defining the limits of the invention.

Figure 1 is a perspective view showing one form of the present invention.

Figures 2 and 3 are sections showing the parts in different positions.

Figure 4 is a perspective view showing the parts locked in place on a member which it is desired to clamp; and, Figure 5 is a perspective view showing the yoke in section and illustrating a modified form of the invention.

Referring to the drawings, 1 designates a flexible band which, in practice, is preferably of sheet metal although a fabric may be employed without departing from the invention. 2 designates a yoke which may be in the form of a casting, but, in practice, is preferably stamped up from sheet metal. The body of the yoke is flat and is provided with an elongated slot 3, while the opposite ends of the yoke are formed with upturned brackets 4 perforated at 5 to allow of the passage of a cotter pin 6 therethrough.

In assembling the parts, one end of the band 1 is passed through the slot 3 and returned upon itself as shown at 7 in Figure 1. The cotter pin is next passed through the alined perforations 5 and the other end of the band after being passed around the object to be clamped is passed through the slot 6ª of the cotter pin as shown best in Figures 1 and 2. If a fabric is employed, the end 7 should be stitched in place, but if the sheet metal band is used, no extraneous means is necessary to anchor this end of the band to the yoke as the tension on the band will draw the yoke with sufficient tightness against the object to be clamped to preclude disengagement of the part 7 from the yoke.

After the parts have been brought into the relative positions shown in Figure 1, any suitable implement such as a screw driver may be passed through the eye 8 of the cotter pin and the cotter pin thereupon rotated to cause the band to be wrapped about the pins after the manner shown in Figure 3. This wrapping of the band about the pin continues until the band has been placed under the necessary tension to effect the desired clamping whereupon the pin may be locked against unwinding by bending the free ends of the pin legs as shown in Figure 4. When the legs of the pin are bent in this manner, they will bear against the object which has been clamped and which is designated in the drawings by the reference character X and by this engagement preclude unwinding of the pin.

When it is desired to release the parts, the ends of the key legs may be bent into normal position whereupon the band may be unwound from the pin and removed from the slot between the legs thereof.

It will be apparent from the foregoing detailed description of the preferred form of the invention that it is unusually simple in construction. The yoke may be readily stamped up from sheet metal and the conventional form of cotter pin may be used so that the manufacturing cost is nominal.

While the use of a cotter pin is preferred, we may, however, employ a pin of special construction such as illustrated in Figure 5. In this showing, one of the holes in the brackets of the yoke is tapered and is circumferentially serrated as at 5ª. A pin of special construction is employed, the pin being made solid and having a shank slotted at 9 to receive the band. The head of the pin is enlarged and is perforated as shown at 10 to permit the introduction of an implement by which the pin is to be rotated. Against the head of the pin is a tapered flange which is serrated as shown at 11 to correspond to the serrations 5ª. The slot 9 is somewhat longer than the width of the band to be passed therethrough.

In utilizing the modified construction of Figure 5, the pin is passed through the alined holes in the yoke for a sufficient distance to permit the free end of the band to be passed through the slot 9, but for an insufficient distance to engage the tapered portion 11 with the serrations 5ª. While the parts are in this relationship, the pin is rotated to draw the band tight about the object to be clamped and when the desired tension has been obtained, a sharp blow is imparted to the head of the pin for the purpose of shifting the pin longitudinally for a sufficient distance to engage the serrated part 11 with the serrations 5ª. The engagement of these parts will lock the pin against unwinding and the band will be maintained under tension so long as this relationship between the parts remains. When it is desired to release the band a sharp knock on the free end of the pin will shift the pin in the opposite direction to disengage the serrations and the pin may be rotated to unwind the band.

In either form of the invention, which we have described, the structure is simple and is unusually convenient to manipulate. The device is adapted to a wide variety of uses. For example, it may be used as a hose clamp, a radio ground clamp, a clamp for mounting broken articles or for making temporary repairs or for clamping insulation on steam pipes or in many other different purposes. In some of its uses, it may be desirable to mount holding or attaching devices on the band, but inasmuch as we have not shown every use to which the invention can be put, we have not attempted to show all of the modifications of which it is susceptible.

The foregoing detailed description sets forth the invention in its preferred practical form, but the invention is to be understood as fully commensurate with the appended claim.

In the accompanying drawings, we have shown the band as passing once around the object to be clamped and directly to the cotter pin, although, in practice, the band may be made longer and passed a number of times around the object before engaging with the pin. It will therefore be noted from Figure 4 that when the cotter pin is bent, it is preferably engaged with the inclined surface 4ª of the yoke, and this arrangement is preferable since when an inclined surface is employed a sure and positive lock against rotation of the pin is obtained.

Having thus fully described the invention, what we claim as new and desire to secure by Letters Patent is:

A clamp embodying a yoke having spaced apart, alined, circular perforations, one of which has a serrated circumference, a pin extending through said perforations and longitudinally slotted between the perforations, said pin being provided with a serrated frusto conical boss normally spaced with respect to and disengaged from the serrated perforation, a band, one end of which is secured to the yoke and the other end of which is passed through the slot in the pin, whereby rotation of the pin will cause the band to be wound on the pin, said pin being thereafter shiftable longitudinally to engage the serrated boss with the serrated perforation to lock the pin against inadvertent unwinding.

In testimony whereof we have signed the foregoing specification.

RENÉ GOUIRAND.
AUGUSTE PACHE.